United States Patent [19]

Pfalzgraf et al.

[11] Patent Number: 4,785,222

[45] Date of Patent: Nov. 15, 1988

[54] APPARATUS FOR ACTUATION OF A SETTING ELEMENT

[75] Inventors: Manfred Pfalzgraf, Frankfurt am Main; Kurt Probst, Schwalbach; Andreas Wokan, Darmstadt, all of Fed. Rep. of Germany

[73] Assignee: VDO Adolf Schindling AG, Frankfurt am Main, Fed. Rep. of Germany

[21] Appl. No.: 72,134

[22] Filed: Jul. 10, 1987

[30] Foreign Application Priority Data

Aug. 22, 1986 [DE] Fed. Rep. of Germany ....... 3628536

[51] Int. Cl.⁴ .............................................. G05B 23/02
[52] U.S. Cl. .................................... 318/565; 123/479; 364/431.11; 371/11
[58] Field of Search ........... 318/565; 364/550, 431.11; 123/479; 371/11

[56] References Cited

U.S. PATENT DOCUMENTS

| | | | |
|---|---|---|---|
| 4,386,427 | 5/1983 | Hosoka | 371/11 |
| 4,450,815 | 5/1984 | Mouvi | 123/479 |
| 4,531,190 | 7/1985 | Drews et al. | 364/431.11 |

Primary Examiner—William M. Shoop, Jr.
Assistant Examiner—M. Bergmann
Attorney, Agent, or Firm—Martin A. Farber

[57] ABSTRACT

A system for the actuation of a setting element with a digital actuation device, particularly for a motor vehicle, wherein the digital actuation device is connected with a monitoring circuit which, upon failure of the digital actuation device, switches a by-pass of the digital actuation device. Preferably the digital actuation device comprises a microcomputer, from an output of which uniform signals are supplied during the course of the program, which signals are evaluated by the monitoring circuit.

3 Claims, 1 Drawing Sheet

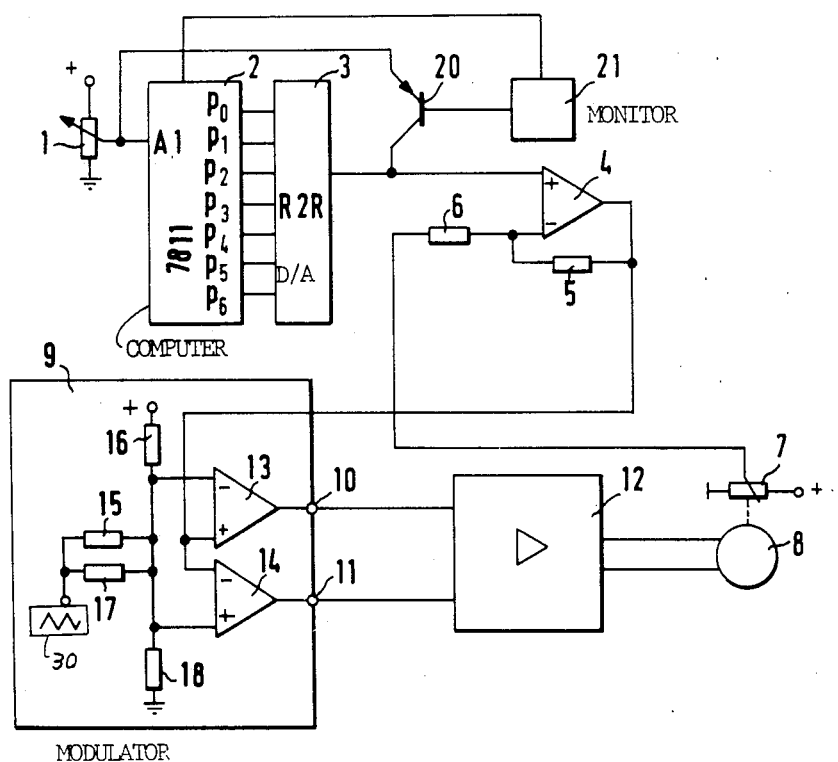

APPARATUS FOR ACTUATION OF A SETTING ELEMENT

FIELD AND BACKGROUND OF THE INVENTION

The invention relates to a system for actuating a setting element with a digital control device, particularly for a motor vehicle.

In the transmission of signals from setting and regulating functions to power elements, such as for example, the use of electronic gas pedal devices for motor vehicles, there is increasing use of regulators with microprocessors. Upon disturbances in the course of a program or with failures of components in the area of the microprocessor, errors in the delivery of the setting and regulating functions can occur with the setting element. This can have the effect of a failure of the entire system or safety considerations endangering driving conditions.

SUMMARY OF THE INVENTION

It is an object of the present invention to provide a system for actuation of a setting element wherein, in the event of failure or erroneous functioning of a digital actuating device, an actuation of the setting element can be accomplished.

According to the invention there is provided a system for actuation of a setting element with a digital actuating device, particularly for a motor vehicle, wherein the digital actuating device (2, 3) is connected with a monitoring circuit (21), which circuit upon failure of the digital actuating device (2, 3) switches a by-pass circuit of the digital actuating device (2, 3).

The system in accordance with the present invention is advantageous in that an actuation of the setting element can be accomplished even upon failure of the digital actuating device, in which case only auxiliary functions provided by the use of the digital actuating device are not available.

A further feature of the invention is that the digital actuating device comprises a microcomputer (2), and a digital-analog converter (3). The input of the computer is connectable via a switch (20) with the output of the digital-analog converter (3), and an output of the monitoring circuit (21) is connected with an actuating input of the switch (20).

By this feature a realization of the system of the invention is possible with few additional components.

Another feature of the invention is that the monitoring circuit (21) is connected to an output of the microcomputer (2) for receiving signals which are supplied regularly during the operation of a program stored in the microcomputer (2). In the absence of the signals from the output of the microcomputer, the monitoring circuit (21) operates to provide a signal for actuating the switch.

By this feature, in a particularly simple manner it is possible to deal with disturbances of the program course as well as disturbances with the failure of components in the area of the microprocessor.

BRIEF DESCRIPTION OF THE DRAWING

With the above and other objects and advantages in view, the present invention will become more clearly understood in connection with the detailed description of a preferred embodiment, when considered with the accompanying drawing.

The sole FIGURE is a schematic illustration of a circuit in accordance with the present invention.

Numerous embodiments of the invention are permitted.

DETAILED DESCRIPTION OF THE PREFERRED EMBODIMENT

A potentiometer 1 serves as a desired value transmitter which, for example, is connected with the gas pedal of a motor vehicle. The output voltage of the desired value transmitter 1 is fed to an input A1 of a microcomputer 2 which, with the illustrated embodiment, is a one chip microcomputer of the type 7811 which includes an analog-digital converter. The outputs P0 to P6 of the microcomputer 2 are connected with a digital-analog converter 3 which essentially comprises an R-2R network.

The output of the digital-analog converter 3 is connected with the non-inverting input of a differential amplifier 4. Feedback for the amplifier 4 is provided via a resistor 5 to the inverting input, and to which also is fed via a further resistor 6 from an actual value transmitter 7 a voltage corresponding to the position of a setting element 8. With the illustrated embodiment, the setting element 8 serves for adjusting a throttle valve of the motor of the vehicle.

The output of the differential amplifier 4 is connected to the input of a pulse-width modulator 9 whose outputs 10, 11 are connected via an output stage 12 to the setting member 8. The pulse-width modulator 9 converts the output voltage of the differential amplifier 4 to pulses, the width of which are proportional to a level of the output voltage. Thereby, inside of an entire range of values, a null position is provided; and pulses are produced by the modulator 9 depending upon the sign of the deviation of the output voltage of the differential amplifier 4 at the output 10 or at the output 11 for the different directions of movement of the setting element 8. The pulse width modulator 9 is constructed in a simple manner of two differential amplifiers 13, 14, and a source 30 of triangular voltages which are fed to the amplifiers 13, 14 via voltage divider resistors 15, 16 and resistors 17, 18, respectively.

The microcomputer 2 with an electronic gas pedal device, for which in the FIGURE an electric part is illustrated, can undertake a series of objectives or tasks. Thus, for example, by the microcomputer 2, the vehicle speed can be controlled and/or can be limited to a maximum permissable value. With a failure of the microcomputer 2, however, without the measures of the invention, the operation of the entire system would be disrupted.

With the illustrated embodiment, the input A1 of the microcomputer is connected to the output of the digital/analog converter 3 via a transistor 20 when a proper program course is no longer present in the microcomputer 2. For this purpose, the base of the transistor 20 is connected with a monitoring circuit 21 which, in turn, is connected to an output of the microcomputer 2. The program deposited in the microcomputer 2 now provides that at least once with each run through the program course, the monitoring circuit 21 is polled. If this polling of the monitoring circuit 21 is absent after a time which is predetermined by the program course, the monitoring circuit 21 emits a voltage which places the transistor 20 in the conducting condition.

The digital-analog converter 3 has a high-impedance output, so that only the output voltage of the desired value transmitter 1, which output voltage is conducted via the transistor 20, arrives at the non-inverting input of the differential amplifier 4.

By bridging-over or bypassing the digital circuitry of the microcomputer 2 and the converter 3 by the transistor 20, an actuation of the setting element 8 with the help of the desired value transmitter 1 is assured even upon failure of the digital actuation circuitry. Only the auxiliary junctions that could have been provided by the microcomputer 2 are no longer possible.

The presently described embodiment has been given by example only and not in a limiting sense.

We claim:

1. In a system for actuation of a setting element with a digital actuating device, particularly for a motor vehicle, the system further comprising:
    a monitoring circuit and a bypass circuit bypassing the digital actuating device; and wherein
    the digital actuating device is connected to said monitoring circuit, which circuit upon a failure of the digital actuating device activates the by-pass of the digital actuating device; and wherein
    the digital actuating device comprises a microcomputer and a digital-analog converter, said bypass circuit comprising an electronic switch; and
    the input of the computer is connected via said bypass circuit with an output of the digital-analog converter, and an output of the monitoring circuit is connected to a control input of the switch.

2. The system according to claim 1, wherein
    the monitoring circuit is connected to an output of the microcomputer, from which output signals are supplied regularly during the course of a program stored in the microcomputer, and the monitoring circuit operates to apply a control signal for the switch upon an absence of the signals from the output of the microcomputer.

3. The system according to claim 1, wherein the system constitutes an electronic gas pedal system, further comprising:
    a desired value transmitter is connected to the input of the computer, said desired value transmitter being operatively connected to a gas pedal of a motor vehicle, and wherein
    the setting element constitutes means for adjusting a throttle valve of an engine of the motor vehicle.

* * * * *